United States Patent [19]
Dollinger et al.

[11] Patent Number: 6,041,767
[45] Date of Patent: Mar. 28, 2000

[54] BAKING OVEN DEVAPORATION

[75] Inventors: Rainer Dollinger, Dinkelsbühl; Josef Hafner, Schopfloch; Claudia Knost, Dinkelsbühl, all of Germany

[73] Assignee: Werner & Pfleiderer Lebensmitteltechnik GmbH, Dinkelsbühl, Germany

[21] Appl. No.: 09/299,749

[22] Filed: Apr. 27, 1999

[30] Foreign Application Priority Data

May 6, 1998 [DE] Germany ............... 198 20 067

[51] Int. Cl.⁷ .................. A21B 1/00; F24C 15/32
[52] U.S. Cl. ............ 126/21 A; 126/21 R; 126/285 R; 219/400; 219/401; 99/447
[58] Field of Search ............... 126/20, 19 R, 126/21 R, 21 A, 273 R, 285 R, 285 A, 286; 219/400, 388, 401; 99/474, 443 R, 443, 447, 476; 432/200

[56] References Cited

U.S. PATENT DOCUMENTS

| | | | |
|---|---|---|---|
| 3,735,750 | 5/1973 | Detterbeck et al. | 126/273 R |
| 4,782,214 | 11/1988 | Voegtlin | 126/21 A |
| 4,984,557 | 1/1991 | Konig | 126/21 A |

FOREIGN PATENT DOCUMENTS

| | | |
|---|---|---|
| 23 701 | 4/1906 | Austria. |
| 2 38 117 | 1/1965 | Austria. |

Primary Examiner—James C. Yeung
Attorney, Agent, or Firm—Browdy and Neimark

[57] ABSTRACT

A baking oven comprises at least one hearth with a baking chamber, a heater, a vaporization device for the supply of vapor and/or fresh air, a devaporization device for the discharge of vapor and/or used air and an overpressure reduction device for overpressure in the baking chamber to be reduced. The devaporization device and the overpressure reduction device are connected to the hearth via a joint discharge duct.

9 Claims, 2 Drawing Sheets

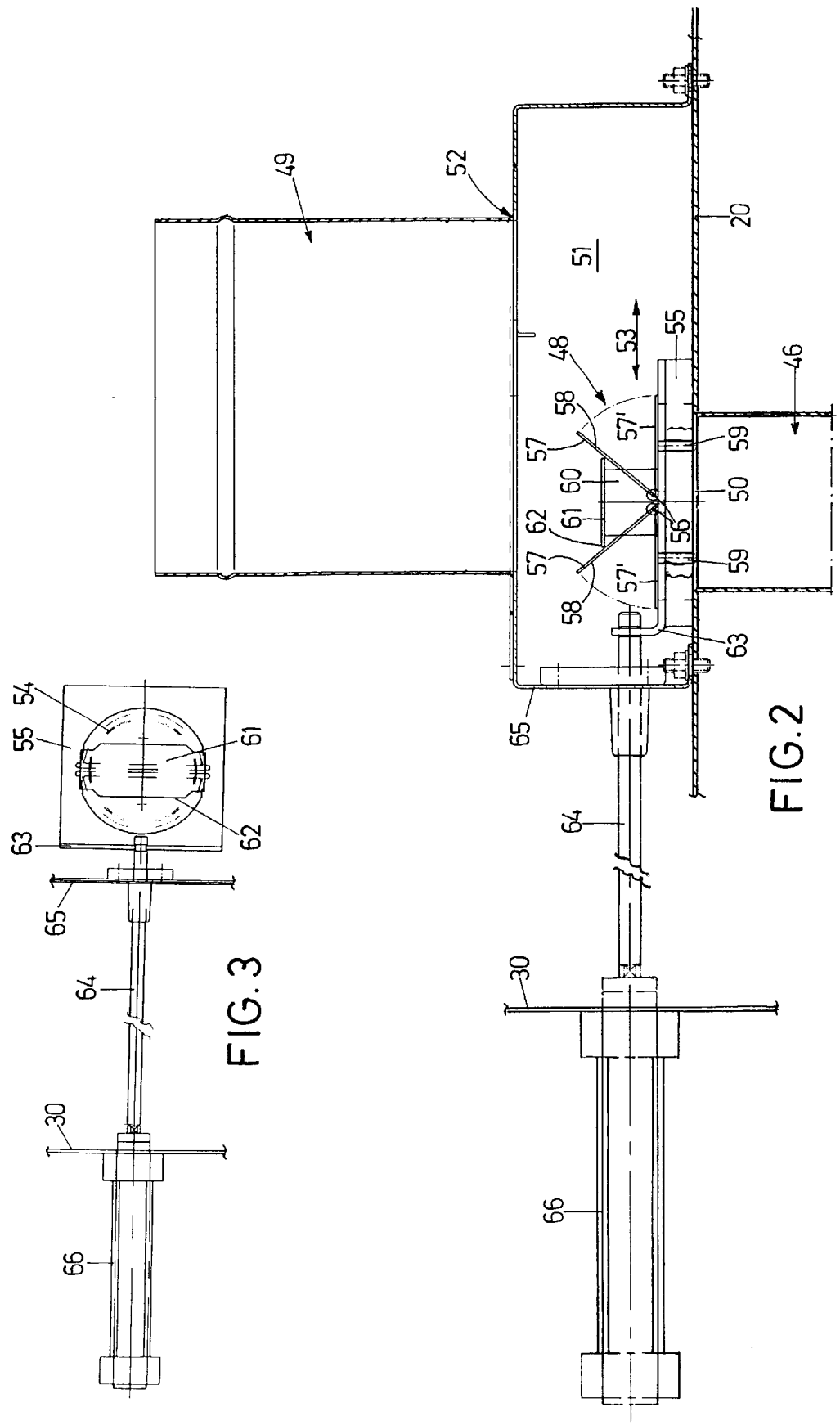

BAKING OVEN DEVAPORATION

BACKGROUND OF THE INVENTION

1. Field of the Invention

The invention relates to a baking oven comprising at least one hearth with a baking chamber; a heater; a vaporization device leading to each hearth for the supply of vapor and/or fresh air; a devaporization device leading away from each hearth for the discharge of vapor and/or used air; and an overpressure reduction device leading away from each hearth for the reduction of overpressure above a given value of pressure in the baking chamber.

2. Background Art

It has been known, in baking ovens, to let the vapor required for the baking process escape spontaneously after a time of exposure which depends on the recipe. The process of feeding vapor into the baking chamber is designated as vaporization, the process of discharging vapor as devaporization. Upon vaporization of the baking chamber, most steam generating systems produce pressure surges in the range of 400 to 500 Pa which will result in uncontrolled escape of vapor from the baking chamber, mostly through the charging flap. In particular in the case of big multi-deck baking ovens, this may constitute a considerable risk for the operating staff. In almost all the known systems, controlled devaporization is put into practice by means of a slide which is opened for devaporizing so that hot steam may escape and fresh air may enter the baking chamber. Reduction of overpressure, if not taking place uncontrolled through the charging flap, is effected through a separate flap valve arrangement having discharge channels of its own. The drawback of known pressure reduction mechanisms resides in that they either expose the operating staff to danger or are constructionally complicated and costly due to the discharge ducts required for each individual baking chamber.

SUMMARY OF THE INVENTION

It is an object of the invention to improve a multi-deck baking oven of the generic type such that devaporization and the reduction of overpressure in the baking chamber can be implemented in as simple a manner as possible.

This object is attained by the devaporization device and the overpressure reduction device being connected to the respective hearth via a joint discharge duct. The gist of the invention resides in the devaporization device and the overpressure reduction device being connected with the baking chamber only by a discharge duct. The advantage of the invention resides in that the shut-off element required for devaporization control and the closure element required for overpressure reduction are integrated into a unit, which is put into practice in that the devaporization device comprises a shut-off element, which is displaceable between a first stop position which blocks the discharge duct, and a second stop position which releases the discharge duct; and in that the overpressure reduction device comprises a closure element disposed in the shut-off element and which is closed when a given pressure acting from the discharge duct on the closure element is undershot, and is open when a given pressure acting from the discharge duct on the closure element is overshot.

Providing pivotal flaps, which is pivotal between a first position in which the recess is closed and a second position in which the recess is opened, is accompanied with the advantage that the flaps open under the action of an overpressure gas flow and, after reduction of same, close again due to gravity. No external drive is necessary. The pressure above which the flaps will open can be modified by varying weights being applied to the flaps.

Further features, details and advantages of the invention will become apparent from the ensuing description of an exemplary embodiment, taken in conjunction with the drawing.

BRIEF DESCRIPTION OF THE DRAWING

FIG. 2 is a cross-sectional illustration of the shut-off element according to FIG. 1; and FIG. 3 is a plan view of the shut-off element according to FIG. 2.

DESCRIPTION OF THE PREFERRED EMBODIMENT

Figure 1:
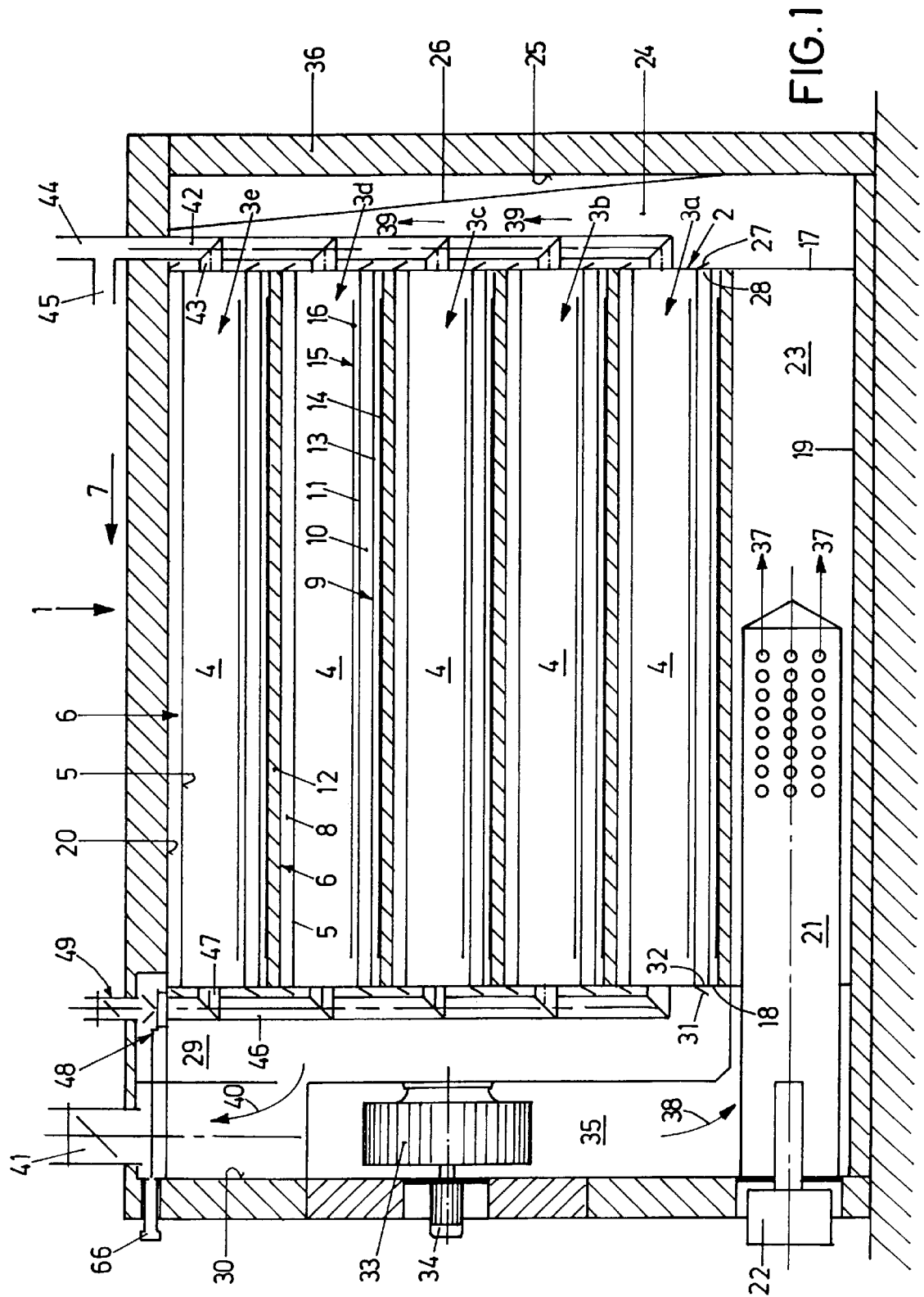
FIG. 1 is a cross-sectional illustration of a multi-deck baking oven.

The baking oven seen in FIG. 1 is a so-called multi-deck tunnel oven, in which a hearth body 2 is provided, comprising five hearths 3a, 3b, 3c, 3d and 3e disposed in stacks one above the other. Each hearth comprises a baking chamber 4 which is defined at its top side by an upper heating surface 5 formed by a thin sheet and substantially heating only by thermal radiation. This heating surface 5 constitutes part of upper-heat heating elements 6 which comprise heating gas ducts 8 extending horizontally and in the transverse direction 7 of the baking oven 1. On its lower side, each baking chamber 4 possesses bottom-heat heating elements 9 which are structured fundamentally in the same way as the upper-heat heating elements 6 and which likewise comprise heating gas ducts 10 extending horizontally and in the transverse direction 7 and are defined towards the baking chamber 4 by a lower heating surface 11. This heating surface 11 is also formed by a thin sheet.

An intermediate insulator 12 is mounted underneath respective bottom-heat heating elements 9 and at a distance from these, i.e. above the upper-heat heating elements 6 of the next lower hearth 3b to 3e, for the individual hearths 3a to 3e to be thermally insulated from each other as far as possible. Between bottom-heat heating elements 9 and the intermediate insulator 12 thereunder, provision is made for a return channel 13 for the lower strand 14 of a baking conveyor belt 15, the upper strand 16 of which is guided above the lower heating surface 11 of the bottom-heat heating elements 9 of a hearth 3a to 3e through the latter's baking chamber 4. The hearths 3a to 3e are defined by a vertical side wall 17 and a side wall 18, both extending perpendicular to the sectional plane seen in FIG. 1 and being supported and mounted on the bottom 19 and the top 20 of the hearth body 2.

Disposed underneath the lowest hearth 3a is a substantially cylindrical combustion chamber 21 into which opens a burner 22. The combustion chamber 21 is followed by a heating gas mixing chamber 23 which opens into the lowermost end of a heating gas supply channel 24 formed between one side wall 17 of the hearths 3a to 3e and the neighboring outer wall 25 of the hearth body 2. The heating gas supply channel 24 is defined by a limiting wall 26 in addition to the side wall 17, the limiting wall 26 being inclined upwards towards the side wall 21 so that the heating gas supply channel 24 has a cross-section that decreases upwards. The heating gas ducts 8 and 10 of the heating elements 6 and 9 are connected to the heating gas supply channel 24, regulating flaps 27 being provided in each case, by means of which the size of the inlet 28 of the heating elements 6 and 9, respectively, is modifiable.

The heating gas ducts 8 and 10 of all the hearths 3a to 3e discharge into a heating gas collecting chamber 29 which is disposed between the side wall 18 and an associated outer wall 30 of the hearth body 2. Alternatively or cumulatively to the regulating flaps 27 in the respective inlet 28 of the heating gas ducts 8 and 10, regulating flaps 31 of the same design can be provided in the outlets 32 of the heating gas ducts 8 and 10 that open into the heating gas collecting chamber 29. The heating gas collecting chamber 29 discharges into a heating gas blower 33 which is driven by a motor 34. This blower 33 discharges into a heating gas return channel 35, downstream of which is disposed the combustion chamber 21. The top 20, the bottom 19 and the outer walls 25, 30 of the hearth body 2 are thermally insulated by means of an insulator 36.

Corresponding to the arrows of flow direction 37, the hot flue gases produced by the combustion process in the burner 22 flow from the combustion chamber 21 into the heating gas mixing chamber 23. This is where they are mixed with cooled heating gases which are supplied corresponding to the arrows of flow direction 38, whereby heating gas of a corresponding mixed temperature is produced. This heating gas is supplied to the heating elements 6 and 9 through the heating gas supply channel 24 and the inlets 28 corresponding to the arrows of flow direction 39. Due to the suction of the heating gas blower 33, it is sucked through the heating elements 6 and 9, leaving them through the outlets 32. It streams through the heating gas collecting chamber 29 and is then forced by the blower 33 into the heating gas return channel 35, from where—as explained above—it arrives in the combustion chamber 21. To the extent fresh heating gas is supplied by the burner 22 to the mixing chamber 23, cooled heating gases are discharged through a chimney 41 corresponding to the arrow of flow direction 40. The heating gases flow through the heating elements 6 and 9 in a straight line in the transverse direction 7. For the purpose of improved heat transfer, they may also be swirled or deflected by formed pieces disposed in the heating elements 6 and 9.

One vertical supply duct 42 per hearth 3a to 3e is disposed in the vicinity of the heating gas supply channel 24; it emerges upwards and, via a branch duct 43, passes through the side wall 17 into the baking chamber 4 of each hearth 3a to 3e. At its outer end, the supply duct 42 is connected to a vapor supply duct 44 and a fresh air supply duct 45. Through this supply duct 42, each hearth can be provided separately with vapor, i.e. water steam, for the treatment with vapor of the dough products or with fresh air for the purpose of clearing from vapor. In the vicinity of the heating gas collecting chamber 29, discharge ducts 46 are disposed which correspond to the supply ducts 42; by means of a branch duct 47 passing through the side wall 18, they are each connected with the baking chamber 4 of a hearth 3a to 3e. Via shut-off elements 48, the discharge ducts 46 are connected to a vapor discharge chimney 49 which leads to the outside and through which vapor and used air can be discharged outwards.

On the charging side of the baking oven 1 which is positioned against the viewing direction in FIG. 1, provision is made for a customary head member in which deflection of the continuous baking conveyor belts 15 takes place. On the discharging side positioned in the viewing direction in FIG. 1, a tail member is disposed, in which the baking conveyor belts 15 are driven and deflected. The conveying direction of the baking conveyor belt 15 is perpendicular to the sectional plane of FIG. 1 in the viewing direction of the beholder. It is possible to dispose several baking ovens 1 modularly and in alignment one after the other between the head member and the tail member, each baking conveyor belt 15, in this case, extending through the aligned baking chambers 4 of the hearths 3a, 3b, 3c, 3d and 3e allocated to one another in this regard. Flaps are provided on the head and tail element, in the closed condition defining the baking chambers 4 to the front and to the rear, and in the opened condition allowing dough pieces to be supplied and finished baked products to be removed. The supply with dough pieces by the head member on the charging side and the removal by the tail member on the discharging side take place in the way customary and known for multi-deck tunnel ovens.

In the following, the shut-off element 48 will be described in detail. The discharge ducts 46 open into openings 50 of corresponding shape in the top 20 and are tightly connected thereto. A chimney chamber 51 which is defined by an upwardly open chimney casing 52 is provided on the side of the top 20 turned away from the discharge duct 46. The shut-off element 48 in the form of a shut-off slide is displaceable in the direction of displacement 53 on the upper side, turned away from the discharge duct 46, of the top 20 so that a given fractional part of the opening 50 is blocked. The shut-off element 48 comprises a base plate 55 in the form of a sliding plate provided with a hole-type recess 54, the outer dimensions of the base plate 55 being selected such that the base plate 55 can cover the opening 50. The size of the recess 54 can be selected in dependence on the size of the opening 50 and the prevailing pressure ratios. As a rule the opening 50 and the recess 54 will be similar to each other in shape and size. On the side of the base plate 55 that is turned away from the discharge duct 46, two flaps 57 are provided which are pivotal about pivot axes 56 and the dimensions of which are selected such that when pivoted downwards they rest on the upper edge of the recess 54, covering same completely and sealing same towards the discharge duct 46. For the dead weight of the flaps 57 and thus the torque relative to the pivot axis 56 to be augmented, additional weights 59 may be mounted on the lower side 58 of the flap. In FIG. 2 these weights 59 are illustrated only on the flaps 57' which are pivoted downwards. For the pivoting range of the flaps 57 to be defined upwards, a stop in the form of a stop plate 61 is provided above the base plate 55; it is joined to the latter via ribs 60 and its stop edges 62 extend substantially parallel to the pivot axes 56 above the base plate 55. The base plate 55 is connected to a slide rod 64 via a connecting rib 63. The slide rod 64 is guided through a side wall 65 of the chimney casing 52 and the outer wall 30 and displaceable in the direction of displacement 53 by means of a pneumatically or hydraulically actuated piston-cylinder drive 66. Other actuation mechanisms such as a manual or an electromotive linear drive may be used instead of the drive 66.

During the operation of the baking oven, treatment with vapor of the baked goods takes place at given intervals, i.e. water steam is fed into the baking chambers 4 via the supply ducts 42. By this time, the shut-off element 48 is in the position seen in FIG. 2, the flaps 57 resting sealingly on the base plate 55. The water steam cannot escape through the discharge ducts 46. Should overpressure be produced by the treatment with vapor in the baking chamber 4, this overpressure causes a pivoting motion of the flaps 57, this motion being directed upwards in FIG. 2. If the treatment with vapor is to be terminated, the shut-off element 48 is displaced by the drive 66 in the direction of displacement 53 to the right in FIG. 2, whereby the opening 50 is uncovered and the vapor may escape through the vapor discharge chimney 49. Fresh air is supplied to the respective baking chambers 4 through the fresh air supply duct 45. Once clearing from vapor is terminated, the shut-off element 48 is slid back into the original position seen in FIG. 2. Should overpressure arise in the baking chamber 4 after the clearing from vapor, this overpressure produces a pivoting motion of the flaps 57 directed upwards in FIG. 2 as described above. The release pressure, i.e. the pressure above which pivoting of the flaps 57 will take place, can be adjusted by corresponding selection of the weights 59. Consequently, the overpressure in the baking chambers 4 is reduced by the flaps 57 of the respective shut-off elements 48 being opened so that the bakery staff is not exposed to danger caused by the hot gas that might otherwise escape at various places. Once pressure compensation has taken place, the flaps 57 close automatically due to gravity.

What is claimed is:

1. A baking oven (1) comprising:
   at least one hearth (3) including a baking chamber (4) arranged therein;
   a heater connected to each baking chamber (4) to heat the baking chamber;
   a vapor supply duct (44) coupled to each baking chamber (4) to supply at least one of vapor and fresh air;
   a discharge duct (46) connected to each baking chamber (4) to discharge at least one of vapor and used air and a reduction of an overpressure above a given value of pressure in each baking chamber (4);
   wherein the discharge duct comprises a shut-off element (48), which is displaceable between
      a first stop position which blocks the discharge duct (46), and
      a second stop position which releases the discharge duct (46); and
   wherein the discharge duct comprises a closure element disposed in the shut-off element (48) and which
      is closed when a given pressure acting from the discharge duct (46) on the closure element is undershot, and
      is open when a given pressure acting from the discharge duct (46) on the closure element is overshot.

2. A baking oven (1) according to claim 1, wherein the discharge duct (46) comprises a cross-sectional surface and the shut-off element (48) comprises a base plate (55), the extension of which exceeds the cross-sectional surface, to be blocked, of the discharge duct (46).

3. A baking oven (1) according to claim 2, wherein the base plate (55) includes a recess (54).

4. A baking oven (1) according to claim 3, wherein at least one flap (57) is provided, which is pivotal between
   i) a first position in which the recess (54) is closed and
   ii) a second position in which the recess (54) is opened.

5. A baking oven (1) according to claim 4, wherein the given value of pressure necessary for the closure element to be opened is modifiable by weights (59) being applied to each flap (57).

6. A baking oven (1) according to claim 4, wherein, in the second position of each flap (57), a pivoting capacity thereof is restricted by a stop (61).

7. A baking oven (1) according to claim 2, wherein the shut-off element (48) is adjustable to take intermediate positions between the first stop position and the second stop position.

8. A baking oven (1) according to claim 2, wherein the shut-off element (48) is operated by one of a hydraulic, pneumatic, electromotive or manual actuation.

9. A baking oven (1) comprising:
   at least one hearth (3) including a baking chamber (4) arranged therein;
   a heater connected to each baking chamber (4) to heat the baking chamber;
   a vaporization device connected to each hearth (3) adapted to a supply at least one of vapor and fresh air;
   a devaporization device connected to each hearth (3) adapted to a discharge of at least one of vapor and used air;
   an overpressure reduction device connected to each hearth (3), leading away therefrom, and adapted to a reduction of an overpressure above a given value of pressure in the baking chamber (4); and
   a joint discharge duct (46) connecting each devaporization device and each overpressure reduction device to a respective hearth (3);
   wherein the shut-off element (48) comprises a cross-sectional surface and the base plate (55) includes an extension which exceeds the cross-sectional surface, to be blocked, of the joint discharge duct (46).

* * * * *